Figure 1:
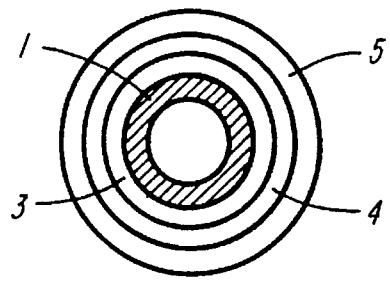

United States Patent [19]
Hilden

[11] Patent Number: 5,562,957
[45] Date of Patent: Oct. 8, 1996

[54] MULTILAYER FIRE PROTECTIVE COATING

[75] Inventor: Oystein Hilden, Krostadelva, Norway

[73] Assignee: Trelleborg Viking AS, Norway

[21] Appl. No.: 433,363

[22] PCT Filed: Nov. 4, 1993

[86] PCT No.: PCT/NO93/00162

§ 371 Date: Jul. 13, 1995

§ 102(e) Date: Jul. 13, 1995

[87] PCT Pub. No.: WO94/10497

PCT Pub. Date: May 11, 1994

[30] Foreign Application Priority Data

Nov. 5, 1992 [NO] Norway .................................. 924267

[51] Int. Cl.$^6$ .................. B32B 1/02; B32B 1/08; F16L 58/04; F16L 59/00; F16L 59/14
[52] U.S. Cl. .................. 428/34.7; 138/103; 138/110; 138/137; 138/140; 138/141; 138/177; 174/121 A; 174/121 AR; 174/121 SR; 174/120 C; 220/88.1
[58] Field of Search .................. 138/103, 110, 138/137, 140, 141, 177; 174/121 A, 121 AR, 121 SR, 120 C; 220/88.1; 428/34.7

[56] References Cited

U.S. PATENT DOCUMENTS

4,942,903  7/1990  Jacobsen .................................. 138/110

FOREIGN PATENT DOCUMENTS

| 3042788A1 | 9/1982 | Germany . |
| 169879B | 5/1992 | Norway . |
| WO88/05885 | 8/1988 | WIPO . |
| WO92/19903 | 11/1992 | WIPO . |

*Primary Examiner*—James C. Cannon
*Attorney, Agent, or Firm*—Thomas J. Engellenner; Lahive & Cockfield

[57] ABSTRACT

A fire safety coating, particularly intended for application to hydrocarbon-conducting steel pipes (1) in the splash zone underneath oil plants at sea, consists of at least three layers, where the outer layer (5) is a mechanical protecting layer of rubber or plastic material, the next inside layer (4) is a flame-stopping layer comprising inorganic fibers and a rubber material, and an inside layer (3) is a rubber material which reacts particularly at a high temperature to liberate gases which both prevent inward penetration of oxygen and cause a transformation of the rubber material in the flame-stopping layer (4) to form a hard shell.

4 Claims, 1 Drawing Sheet

MULTILAYER FIRE PROTECTIVE COATING

The present invention relates to fire safety coatings for structures, particularly for steel tanks and pipelines for hydrocarbons in offshore activities, possibly for plastic material conduits for e.g. fire extinguishing installations in the oil industry, but also as a coating on e.g. flat or profiled structures of plastics (e.g. fiber reinforced plastics), rubber (e.g. cable), metal (e.g. ordinary steel, titanium, aluminum alloys etc.) or other materials.

In catastrophic fires in oil/gas plants at sea it is important regarding crew safety that adequate time for evacuation is provided, from the moment when the fire is a fact. It is very important that the risers, which are fully loaded with hydrocarbons and have been shut on top as a result of automatic closing procedures, are not heated too rapidly by e.g. burning oil on the sea surface, because if these risers spring a leak due to high temperature, even more oil/gas will flow out and increase the extent of the fire to a substantial and maybe even fatal degree.

The risers mentioned are constructed of steel, and are often provided with a rubber cladding vulcanized thereon for corrosion protection and mechanical protection in the splash zone. However, in order to obtain also a high degree of delay of the temperature rise in the case of a typical surrounding temperature of 1000°–1100° C., i.e. a hydrocarbon fire, it is necessary to undertake a further refinement of the pipe cladding.

Fire protecting combination coatings, i.e. multilayer coatings, are per se previously known. For instance from European patent application no. 90,635 is known a three-layer material where the outer layer is heat reflecting, for example a metal sheath, the intermediate is a so-called endothermal material (i.e. it absorbs heat in connection with a phase transition), e.g. aluminum hydrate, and the inner layer is a thermally intumescent and insulating material. These three layers come into effect successively, and will provide a substantial delay of the temperature rise inside the inner layer. But this type of coating does not hold the mechanical strength necessary in a tough milieu like e.g. the splash zone beneath an oil plant.

Further, from European patent application no. 283,385 is known a three-layer coating where the outer layer is a composite material with a mineral matrix surrounding structural reinforcement elements. Thus, the outer layer may be inorganic, since the mineral matrix can be a material similar to a ceramic, and the reinforcement elements are metal fibers or mineral fibers. The function of the outer layer is to provide structural solidity for the coating, and to provide resistence against flames and "thermal shocks". An intermediate layer consists of a felt of refractory fibers, and this layer is intented to constitute a fire-retarding shield for the material inside. The inner layer is a thermally insulating layer with a cell structure, preferably of an organic type, i.e. cork or resin of a heat curable or thermo-plastic type. Not even such a cladding is suitable regarding mechanical strength and corrosion protection in rough surroundings. However, the function of the outer and inner layer according to EP 283,385 corresponds to the particular fire safety functions for the inner and outer layers according to the present invention in its general form, even though these functions are preferably obtained using other types of materials than in EP 283,385.

However, the intermediate layer of EP 283,385 suffers from the substantial drawback that oxygen may find its way therethrough, and hence lead to oxidation of the inner layer, thereafter leading to alteration of properties in an unfavourable direction, i.e. the thermal insulating property of the inner layer may in such a case be substantially impaired.

From Norwegian laid open publication no. 167,766 is known a fire- and corrosion protective object which comprises a multilayer protection, including e.g. first a layer of fire-resistant material consisting of e.g. multilayer wound tape or of prefabricated, cast pipe elements of an ethylene copolymer. On the outside thereof is a layer of a light, thermally insulating material, e.g. glass wool, ceramic fiber or mineral wool, which material does not tolerate exposure to fire. On the outside of this layer there is another layer of the same type as the inner layer. This fire-resistant material has the property that at a high temperature it transforms into a ceramic, stable and fire-protecting phase, and may consist of a mixture of a thermoplastic, aluminum hydroxide and calcium carbonate/calcium magnesium carbonate. The protection is in this case based upon the fact that the fire-resistant material exhibits a phase transition to a ceramic, stable phase when exposed to a high temperature. The idea is to ensure that the light, thermally insulating material shall keep its heat insulating properties as long as possible by not being exposed to a destructively high temperature too early.

From Norwegian laid open publication no. 167,687 is known a further development of the last mentioned multilayer protection, where an inner (first) fire-protecting layer has a low thermal conductivity in the range 100°–300° C. This layer is constituted by glass fiber tape or by a foamed thermally insulating material which is a mixture of a thermoplastic, aluminum hydroxide and $CaCO_3/CaMgCO_3$. However, also in this case the most important effect is that one or several layers transform to a ceramic and stable fire-protecting phase under the influence of a high temperature.

However, particulary in marine applications there exist strong requirements regarding the ability of the protecting layer to tolerate mechanical stresses, and the materials utilized in the above mentioned prior art are hardly able to exhibit the necessary strength during the sometimes extremely rough conditions which may prevail on offshore platforms.

The present invention provides a coating where the drawbacks of the prior art regarding mechanical strength, corrosion retarding effect and oxygen barrier effect are remedied.

The above mentioned result is achieved by providing a fire safety coating of the type stated in the appended patent claims.

Figure 2:
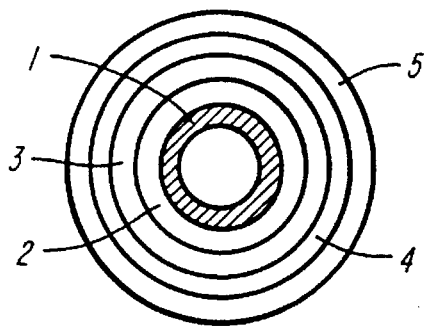
Figure 3:
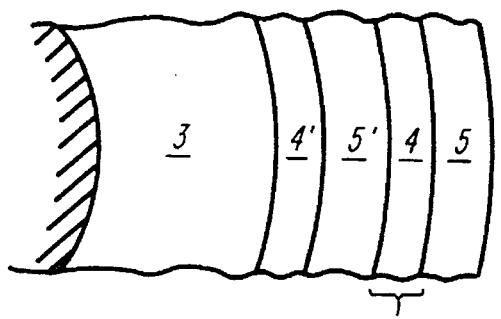
Figure 4A:
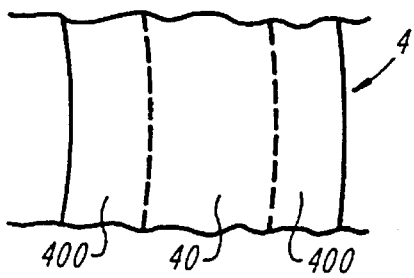
Figure 4B:
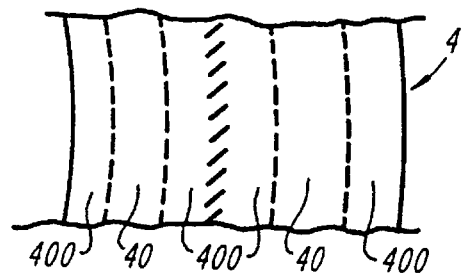

The invention will be described closer in the following by means of embodiment examples, and with reference to the appended drawings, where FIG. 1 shows a section through a plastic pipe with a fire safety coating in accordance with the essential aspect of the invention, FIG. 2 shows in a corresponding manner a coated steel pipe, where an extra layer is included, FIG. 3 shows a detail drawing of an embodiment where several layers are included in order to provide further enhanced fire protection, and FIGS. 4a and 4b shows in close detail embodiments of the flame-stopping layer.

FIG. 1 shows the embodiment of the invention which comprises only the most important features: a plastic pipe 1 which for instance conducts a liquid (not shown) in the center thereof, is to be protected. In the outermost position there is a layer 5 of natural rubber, synthetic rubber or plastic to constitute a mechanical protection layer. An inside layer 4 is provided to stop flame attacks, and comprises an inorganic material. Preferably layer 4 consists of inorganic fibers, for instance a glass fiber ribbon with a rubber or plastic layer applied on both sides thereof, wound around inside layers and vulcanized to be fixed thereto.

Inside layer 4 there is a layer 3 consisting of a thermally highly insulating rubber material having great mechanical strength. This layer 3 provides delay of the heat transport in toward the pipe 1. The layer 3 consists of a natural or synthetic elastomer, that is e.g. polyisoprene, polychloroprene or similar, and further vulcanizing chemicals are admixed, e.g. sulphur, thiurames, mercaptanes or similar substances. Further, there is included zinc oxide, magnesium oxide or possibly both, and the material also comprises natural fibers. The composition is as follows: The elastomer is present in 25–85 parts by weight, the vulcanizing chemicals in 0.2–35 parts by weight, zinc and/or magnesium oxide in 2–30 parts by weight and natural fibers in 10–40 parts by weight of the total material.

In FIG. 2 is shown a variant where a hydrocarbon-conducting steel pipe, or more generally a pipe of a metal exposed to corrosion is to be protected. The configuration of the multilayer coating is then exactly as indicated above, however closest to the steel pipe 1 itself there will be a corrosion-inhibiting layer 2 of rubber or plastic, which layer optionally also may exhibit good characteristics regarding heat insulation. Preferably a specially developed neoprene rubber material may constitute this particularly corrosion inhibiting and mechanically strong layer 2 which is vulcanized directly onto steel pipe 1.

Thermally insulating layer 3 has special qualities in connection with a fire. In the first stage of a fire this material, which preferably has the composition indicated above, works as a heat insulator. When this layer 3 is heated due to the fire, the layer develops reactive gases which draw outwards and react with the outside layer 4, converting this layer into a hard shell during the fire. The surplus thereafter remaining of the gases is combustible, and causes a counterfire on the outer surface of layer 5, against the actual fire.

Due to the overpressure from the gases formed, or actually due to the outwards migration of the gases, oxygen will not be able to penetrate from the outside to cause a combustion of the thermally insulating layer 3 itself. Thus, a gas barrier is formed, which barrier ensures that undesired oxidation does not occur to this layer 3, and layer 3 therefore keeps its favourable characteristics for a long time during a fire. However, the thermally insulating layer 3 will all the time be subject to pyrolysis, i.e. degradation without any supply of oxygen. This pyrolysis leads to the formation of a new material structure inside layer 3, but this new structure also exhibits very good heat insulating characteristics, and takes care of keeping away the fire heat from the underlying structure 1 which is to be protected.

As mentioned above, the inorganic layer 4 works as a flame shield, comprising a non-combustible material, which thus prevents the flames from reaching the underlying rubber. In addition to the mechanical protection constituted by layer 5, the material of layer 5 shall also be a rubber or plastic material which is impervious to water, and additionally it protects the rest of the materials from degradation due to influence from the sun or chemical substances like e.g. ozone.

In FIG. 3 is shown a "close-up" of the same three layers 3, 4 and 5 outside a structure to be protected, but further layers have been added. In order to further increase the time until destruction of the structure will take place, layers of the type 4 and 5 have been repeated as layers nos. 4' and 5'. (Of course, even more layers may be used, however the increase in protection ability must simply be weighed against increased costs.) Thus, layer 5' is a mechanically protective layer, preferably of chloroprene rubber, and layer 4' is an inorganic flame retarding/flame stopping layer, of the same type as layer 4.

In FIG. 4 is shown two detail pictures regarding embodiments of the flame-stopping layer 4. As it appears from FIG. 4a, layer 4 is constituted by for instance a glass fiber ribbon 40 which on both sides have been coated by a rubber or plastic material 400, and the coated glass fiber ribbon has thereafter been wound onto the underlying material and fixed thereto by vulcanization. In FIG. 4b it appears that two such coated glass fiber tapes may be wound above each other, so that after vulcanization the complete layer 4 will consist of for instance rubber 400 outermost and innermost, as well as in the middle, and there will be two glass fiber layers 40 therebetween. The rubber or plastic material 400 which is used, has the quality that it reacts with the pyrolysis gases which draw outwards from the thermally insulating layer 3, and a reaction will then take place, wherein the rubber or plastic material 400 is transformed to a hard shell which also is flame resistant.

Generally it must be noted that all rubber layers 2, 3, 5' and 5 present in the invention exhibit great mechanical strength and are well suited for use in difficult surrounding Also fiber layers 4' and 4 are very strong. Thus, in total there is achieved, possibly only with the three-layer protection which constitutes the essence of the invention, a fire safety coating with very good fire properties and which in addition is well suited as a coating against mechanical wear and corrosion under tough normal conditions.

It should be mentioned that fire tests which have been conducted, show that the coating in accordance with the invention is very effective. Steel pipes with a coating thickness of 3 mm for layer 2, 31 mm for layer 3 and in total 16 mm for layers 4'–5, turn out to withstand a fire with temperature 1100° C. with an inside temperature not exceeding 120° C. during a time period of about 2 hours, which test result satisfies international safety requirements with good margin.

I claim:

1. A multilayer fire-protecting, corrosion-protecting and mechanically protective coating system for a curvilinear structure (1) e.g., a tank, a pipe or a cable of rubber, plastic (e.g. fiber-reinforced plastic) or metal, wherein one or several of the layers (3–5) have fire-protecting properties, an outwardly situated layer (5) of the multilayer coating comprises a mechanical protection layer of rubber or plastic which is impervious to water and is sun and ozone resistant, a flame-stopping layer (4) is being provided immediately inside said outwardly situated layer (5), said flame-stopping layer (4) comprising an inorganic material having a sandwich configuration, and a thermally insulating layer (3) is provided between said structure (1) and said flame-stopping layer (4), the thermally insulating layer (3) comprising a natural or synthetic elastomer and the flame-stopping layer sandwich (4) comprises at least one layer of flame-resistant inorganic material (40) having a rubber or plastic material (400) applied to both sides thereof, said flame-stopping layer (4) being fixedly vulcanized to the thermally insulating layer (3), and the rubber or plastic material (400) applied thereto is capable of reacting in a fire with pyrolysis gases developed through heating of the thermally insulating layer (3) to form a hard and flame-resistant shell.

2. The protective multilayer coating structure in accordance with claim 1, for a curvilinear structure (1) of metal subject to ambient atmospheric corrosion wherein a corrosion-protecting and heat insulating layer (2) of rubber or plastic material has been applied directly onto the structure (1) inside the thermally insulating layer (3) and fixed to insulation layer (3) by vulcanization.

3. The protective multilayer coating system in accordance with claim 1 wherein a pair of layers (4', 5') has been disposed between thermally insulating layer (3) and flame-stopping layer (4) to provide enhanced mechanical and flame-stopping protection.

4. The protective multilayer coating structure in accordance with claim 2, wherein a pair of layers (4', 5') has been disposed between thermally insulating layer (3) and flame-stopping layer (4) to provide extended mechanical and flame-stopping protection.

* * * * *